United States Patent [19]

McLaughlin et al.

[11] 3,742,051
[45] June 26, 1973

[54] 3,5-DICHLORO-N-(1,1,DIMETHYL-2-PROPYNYL)BENZIMIDOYL HALIDES AND DERIVATIVES

[75] Inventors: Thomas A. McLaughlin, Langhorne; Colin Swithenbank, Perkasie; Roy Y. Yih, Doylestown, all of Pa.

[73] Assignee: Rohm and Haas Company, Philadelphia, Pa.

[22] Filed: June 2, 1971

[21] Appl. No.: 149,346

[52] U.S. Cl...... 260/566 D, 260/453 R, 260/564 R, 71/121
[51] Int. Cl.......................................... C07c 119/00
[58] Field of Search................................. 260/566 D

[56] References Cited
UNITED STATES PATENTS 3,173,951  3/1965  Speziale et al.................. 260/566 D
3,230,255  1/1966  Speziale et al.................. 260/566 D
3,282,923  11/1966 Ottenheym et al. ......... 260/566 D X FOREIGN PATENTS OR APPLICATIONS
4,013,726  7/1965  Japan.............................. 260/566 D Primary Examiner—Leon Zitver
Assistant Examiner—Gerald A. Schwartz
Attorney—G. W. F. Simmons and C. A. Castellan

[57] ABSTRACT

Novel compounds are disclosed which are 3,5-dichloro-N-(1,1-dimethyl-2-propynyl)benzimidoyl halides and imidate, thioimidate and amidine derivatives thereof of the general structure

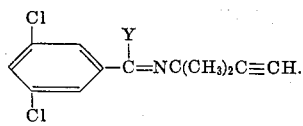

These compounds possess herbicidal activity.

3 Claims, No Drawings

3,5-DICHLORO-N-(1,1,DIMETHYL-2-PROPYNYL)-BENZIMIDOYL HALIDES AND DERIVATIVES

This invention is concerned with novel compounds of the general formula

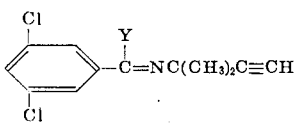

(I)

wherein
Y is bromine or chlorine; the group, $XR_1$ wherein X is oxygen or sulfur and $R_1$ is alkyl of 1 to 5 carbon atoms; the group O-Aryl wherein Aryl is phenyl and phenyl substituted with halogen, preferably chlorine, or nitro; and the group $NR_2R_3$ wherein $R_2$ and $R_3$ are individually alkyl groups of 1 to 5 carbon atoms.

The following type compounds are represented by these structures:

a. imido halides

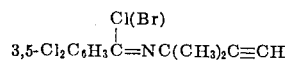

(II)

b. imido esters and thioesters

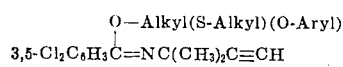

(III)

c. amidines

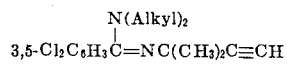

(IV)

Collectively they may be termed imidic acid derivatives. Even though imido halides, esters and thioesters and amidines are well known classes of organic compounds, the specific structures represented by Formulas II, III and IV are all novel. They have utility as herbicides.

An article by Roger and Neilson, "The Chemistry of Imidates" in Chemical Review, 61, pp. 179 to 203 (1961), provides a very thorough review of the literature relating to imidates and their chemistry. U.S. Pat. Nos. 3,084,192 3,119,831 and 3,189,649 disclose the use of phenyl substituted amidines as herbicidally effective compounds. U.S. Pat. No. 3,453,311 discloses the herbicidal properties of certain aryl N-(aryl)alkanoimidates.

The starting material for the preparation of such compounds is 3,5-dichloro-N-(1,1-dimethyl-2-propynyl)benzamide. This compound is described in U.S. Pat. No. 3,534,098 and has been made by reaction of 3,5-dichlorobenzoyl chloride with 3-amino-3-methylbutyne as a solid melting at 155°–158°C. It is the selective herbicide known under the trademarked name of Kerb.

3,5-Dichloro-N-(1,1-dimethyl-2-propynyl)benzamide is reacted with a halogenating agent such as phosphorus trichloride or tribromide, phosphorus pentachloride or pentabromide, or sulfonyl chloride to give a compound of Formula II. The preferred compound thus prepared is 3,5-dichloro-N-(1,1-dimethyl-2-propynyl)benzimidoyl chloride, 3,5-$Cl_2C_6H_3C(Cl)=NC(CH_3)_2C\equiv CH$. There was a possibility that the triple bond would interfere with the formation of the benzimidoyl chloride.

The 3,5-dichloro-N-(1,1-dimethyl-2-propynyl)-benzimidoyl chloride (or bromide) is then reacted with the following type agents:

a. alcohols and alkoxides to give imido alkyl esters,

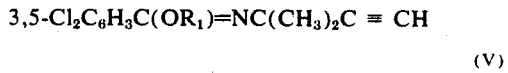

(V)

wherein $R_1$ is alkyl of 1 to 5 carbon atoms, b. mercaptans and mercaptides to give imido alkyl thioesters,

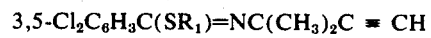

(VI)

wherein $R_1$ is alkyl of 1 to 5 carbon atoms, c. phenols and phenates to give imido aryl esters,

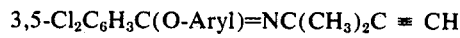

(VII)

wherein Aryl is phenyl or phenyl substituted with halogen or nitro, and d. dialkylamines to give amidines,

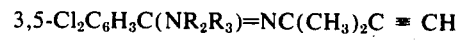

(VIII)

wherein $R_2$ and $R_3$ are alkyl groups of 1 to 5 carbon atoms.

Representative compounds of these structures include:

3,5-dichloro-N-(1,1-dimethyl-2-propynyl)benzimidoyl bromide ethyl 3,5-dichloro-N-(1,1-dimethyl-2-propynyl)benzimidate isopropyl 3,5-dichloro-N-(1,1-dimethyl-2-propynyl)benzimidate sec-butyl 3,5-dichloro-N-(1,1-dimethyl-2-propynyl)benzimidate pentyl 3,5-dichloro-N-(1,1-dimethyl-2-propynyl)benzimidate propyl 3,5-dichloro-N-(1,1-dimethyl-2-propynyl)thiobenzimidate butyl 3,5-dichloro-N-(1,1-dimethyl-2-propynyl)thiobenzimidate t-butyl 3,5-dichloro-N-(1,1-dimethyl-2-propynyl)thiobenzimidate amyl 3,5-dichloro-N-(1,1-dimethyl-2-propynyl)thiobenzimidate 2-chlorophenyl 3,5-dichloro-N-(1,1-dimethyl-2-propynyl)benzimidate 3-chlorophenyl 3,5-dichloro-N-(1,1-dimethyl-2-propynyl)benzimidate 4-chlorophenyl 3,5-dichloro-N-(1,1-dimethyl-2-propynyl)benzimidate 3,5-dichlorophenyl 3,5-dichloro-N-(1,1-dimethyl-2-propynyl)benzimidate 2,4,5-trichlorophenyl 3,5-dichloro-N-(1,1-dimethyl-2-propynyl)-benzimidate 2-nitrophenyl 3,5-dichloro-N-(1,1-dimethyl-2-propynyl)benzimidate 3-nitrophenyl 3,5-dichloro-N-(1,1-dimethyl-2-propynyl)benzimidate 3,5-dichloro-N-(1,1-dimethyl-2-propynyl)-N',N'-dimethylbenzamidine 3,5-dichloro-N-(1,1-dimethyl-2-propynyl)-N',N'-diethylbenzamidine 3,5-dichloro-N-(1,1-dimethyl-2-propynyl)-N'-ethyl-N'-methylbenzamidine 3,5-dichloro-N-(1,1-dimethyl-2-propynyl)-N'-propyl-N'-methylbenzamidine 3,5-dichloro-N-(1,1-dimethyl-2-propynyl)-N',N'-diisopropylbenzamidine 3,5-dichloro-N-(1,1-dimethyl-2-propynyl)-N',N'-dipentylbenzamidine

Example 1

Preparation of 3,5-dichloro-N-(1,1-dimethyl-2-propynyl)-benzimidoyl chloride 3,5-Dichloro-N-(1,1-dimethyl-2-propynyl)-benzamide (25.6 g., 0.1 mole) was added to a solution of phosphorus pentachloride (20.8 g., 0.1 mole) in benzene. After standing overnight at room temperature the solvent was removed under reduced pressure to give a 25 g. residue which solidified on standing. Recrystallization from a little octane gave 14 g. m.p. 54°–56°C. This was a 51 percent yield of 3,5-dichloro-N-(1,1-dimethyl-2-propynyl)benzimidoyl chloride.

Example 2

Preparation of methyl 3,5-dichloro-N-(1,1-dimethyl-2-propynyl)-benzimidate

Sodium methoxide (3 g., 0.055 mole) in methanol (50 ml.) was cooled in ice and 3,5-dichloro-N-(1,1-dimethyl-2-propynyl)benzimidoyl chloride (13.7 g., 0.05 mole) was added all at once. After 15 minutes the ice bath was removed and the mixture allowed to stand at room temperature for two days. Thin layer chromatography confirmed the presence of an imidate. Sodium chloride was filtered off and the filtrate was concentrated, then slurried with ether and refiltered and reconcentrated to give 12 g. of clear liquid. This was distilled to give 9 g. of, as the main fraction, a water clear liquid distilling at 77.5°–80°C/0.05 mm. By infrared this was confirmed to be methyl 3,5-dichloro-N-(1,1-dimethyl-2-propynyl)benzimidate.

Example 3

Preparation of methyl 3,5-dichloro-N-(1,1-dimethyl-2-propynyl)thiobenzimidate

Sodium methoxide (2.7 g., 0.05 mole) and 100 ml. of methanol were placed in a pressure bottle, cooled to 0°C. and methyl mercaptan (2.4 g., 0.05 mole) was added, the bottle sealed and allowed to stand over night at 25°C. There was then added 3,5-dichloro-N-(1,1-dimethyl-2-propynyl)benzimidoyl chloride (13.7 g., 0.05 mole), the bottle resealed and the mixture stirred magnetically over night. The sodium chloride was filtered off and the volatile materials removed. The residue was slurried in ether, filtered and the filtrate concentrated to give an oil, which by infrared was shown to be mainly a methyl thiobenzimidate. The oil was distilled to give 8.5 g. of a main fraction distilling at 110°–113°C./0.2 mm. This was a 60 percent yield of methyl 3,5-dichloro-N-(1,1-dimethyl-2-propynyl)thiobenzimidate.

Example 4

Preparation of phenyl 3,5-dichloro-N-(1,1-dimethyl-2-propynyl)benzimidate 3,5-Dichloro-N-(1,1-dimethyl-2-propynyl)benzimidoyl chloride (13.7 g., 0.05 mole) was added to a solution of phenol (5.2 g., 95 percent pure, 0.05 mole) and triethylamine (5.1 g., 0.05 mole) in benzene (50 ml), with stirring, at 0°C. Stirring was continued for 4 hours then the mixture was allowed to stand for 2 days. The precipitated triethylamine hydrochloride (6.1 g., 89 percent) was filtered off and the solvent removed under reduced pressure. The residue (20.6 g.) was then distilled. The fraction boiling at 100°–150°C./0.4 mm. (12.3 g.) crystallized on standing, and a small portion was taken up in ether, filtered, and the solvent removed to give a solid melting at 82°–84°C. The distilled product was a 74 percent weight yield of phenyl 3,5-dichloro-N-(1,1-dimethyl-2-propynyl)benzimidate.

Example 7

Preparation of 3,5-dichloro N-(1,1-dimethyl-2-propynyl)-N',N'-di-n-propyl-benzamidine A solution of 3,5-dichloro-N-(1,1-dimethyl-2-propynyl)benzimidoyl chloride (13.7 g., 0.05 mole) and di-n-propylamine (5.1 g., 0.05 mole) in benzene (25 ml.) was stirred under reflux overnight, then further amine added (15.3 g., 0.15 mole) and the solution heated for 2 hours. The solvent and excess amine were removed under reduced pressure and the residue taken up in ether and washed with water. The ether was stripped off and the residue dried by azeotroping with benzene, followed by removal of the benzene. The residue was taken up in heptane, filtered and the solvent removed from the filtrate. The residue was then distilled to give 11.6 g., distilling at b.p. 110°C./0.45 mm. This was a 62 percent yield of 3,5-dichloro-N-(1,1-dimethyl-2-propynyl)-N',N'-di-n-propylbenzamidine.

TABLE 1

3,5-$Cl_2C_6H_3\overset{Y}{\underset{|}{C}}=NC(CH_3)_2C\equiv CH$ Compounds

| Example | Y= | Name |
|---|---|---|
| 1 | Cl | 3,5-dichloro-N-(1,1-dimethyl-2-propynyl)benzimidoyl chloride |
| 2 | OCH₃ | methyl 3,5-dichloro-N-(1,1-dimethyl-2-propynyl)benzimidate |
| 3 | SCH₃ | methyl 3,5-dichloro-N-(1,1-dimethyl-2-propynyl)thiobenzimidate |
| 4 | OC₆H₅ | phenyl 3,5-dichloro-N-(1,1-dimethyl-2-propynyl)benzimidate |
| 5 | OC₆H₃Cl₂-2,4 | 2,4-dichlorophenyl 3,5-dichloro-N-(1,1-dimethyl-2-propynyl)benzimidate |
| 6 | OC₆H₄NO₂-4 | 4-nitrophenyl 3,5-dichloro-N-(1,1-dimethyl-2-propynyl)benzimidate |
| 7 | N(C₃H₇-n)₂ | 3,5-dichloro-N-(1,1-dimethyl-2-propynyl)-N',N'-dipropylbenzamidine |

TABLE II

Physical data for 3,5-Cl$_2$C$_6$H$_3$C(=NC(CH$_3$)$_2$C≡CH)Y compounds

| Example | Melting (or boiling) point, °C. | Empirical formula | Percent elemental analysis found (calculated) | | | | |
|---|---|---|---|---|---|---|---|
| | | | C | H | Cl | N | O (or S) |
| 1 | 54 to 56 | C$_{12}$H$_{10}$Cl$_3$N | 52.3 (52.5) | 3.8 (3.7) | 38.2 (38.8) | 5.2 (5.1) | |
| 2 | (78/0.05 mm.) | C$_{13}$H$_{13}$Cl$_2$NO | 57.5 (57.8) | 5.1 (4.9) | 26.4 (26.3) | 5.1 (5.2) | 26.4 (26.3) |
| 3 | (110 to 113/0.2 mm.) | C$_{13}$H$_{13}$Cl$_2$NS | 54.7 (54.5) | 5.6 (4.6) | 25.2 (24.8) | 4.9 (4.9) | 10.7 (11.2) |
| 4 | 86 to 84 | C$_{18}$H$_{15}$Cl$_2$NO | 65.0 (65.1) | 4.8 (4.6) | 21.3 (21.3) | 4.3 (4.2) | 5.3 (4.8) |
| 5 | 100 to 102 | C$_{19}$H$_{13}$Cl$_4$NO | 53.8 (53.9) | 3.3 (3.3) | 35.1 (35.4) | 3.6 (3.5) | 4.5 (4.0) |
| 6 | 185 to 183 | C$_{18}$H$_{11}$Cl$_2$N$_2$O$_3$ | 57.0 (57.3) | 3.5 (3.7) | 18.7 (18.8) | 7.2 (7.4) | 13.1 (12.7) |
| 7 | (110/0.45 mm.) | C$_{18}$H$_{21}$Cl$_2$N$_2$ | 63.6 (63.7) | 7.3 (7.1) | 21.3 (20.9) | 8.2 (8.3) | |

The compounds of this invention possess herbicidal properties and are effective against both monocotyledonous and dicotyledonous weeds and as preemergent and postemergent herbicides. In general these compounds demonstrate the same type of weed control activity and crop tolerance as that of the parent compound from which they are derived, i.e., 3,5-dichloro-N-(1,1-dimethyl-2-propynyl)benzamide. This may indicate that these derivatives hydrolyze to this parent benzamide which is then functioning as the herbicide. Each derivative may thus serve as a reservoir for this active principle and allow a slow release of it to give prolonged residual activity. Furthermore the parent benzamide is a relatively insoluble solid and accordingly somewhat difficult to formulate, particularly as an emulsifiable concentrate. These more soluble derivatives allow the preparation of emulsifiable concentrates or even solutions of relatively high active ingredient content. Such formulations and solutions are particularly useful for low volume sprays which are practically not permitted for Kerb herbicide due to its relatively low solubility.

Economically important crops which have been found to be tolerant to the compounds of this invention include corn, cotton, legumes such as alfalfa and soybean, lettuce, rice, and wheat. These compounds accordingly provide a valuable and practical contribution to the field of weed control.

Herbicidal compositions are prepared from the compounds of this invention by incorporating them in an agronomically acceptable carrier, with the addition of surfactants or other suitable additives, if desired, and admixing to give uniformly formulated mixtures. By "agronomically acceptable carrier" is meant any substance which can be used to dissolve, dispense or diffuse the chemical to be used therein without impairing the effectiveness of the toxic agent and which does no permanent damage to such environment as soil, equipment and agronomic crops.

Emulsion concentrate formulations may be made by dissolving the compounds of this invention in an agronomically acceptable organic solvent and adding a solvent-soluble emulsifying agent. Suitable solvents for these imidic acid derivatives are found in the hydrocarbon, chlorinated hydrocarbon, ketone, ester, alcohol and amide classes of organic solvents, such as xylene, naphthas, ethylene dichloride, cyclohexanone, methyl ethyl ketone, isophorone, methyl hexanoate or dimethylformamide, the preferred solvents being ketones or ketone-hydrocarbon mixtures. The emulsifying agents may be anionic, cationic or non-ionic in character. Anionic surfactants include alcohol sulfates or sulfonates, alkylarene sulfonates or sulfosuccinates, such as calcium dodecylbenzenesulfonate or sodium dioctyl sulfosuccinate. Cationic surfactants include fatty acid alkyl amine salts and fatty acid alkyl quaternaries, such as laurylamine hydrochloride or lauryldimethylbenzylammonium chloride. Non-ionic emulsifying agents which may be used include ethylene oxide adducts of alkylphenols, fatty alcohols, mercaptans or fatty acids, such as polyethylene glycol esters of stearic acid or polyethylene glycol ethers of palmityl alcohol or of octylphenol having from about 7 to 100 groups. The concentration of the active ingredients may vary from 10 to 80 percent, but is preferably 25 to 50 percent, and the concentration of the emulsifying agents is usually 0.5 to 10 percent by weight, with the remainder of the formulation being the carrier.

Wettable powders are made by incorporating the imidic acid derivatives in a finely divided solid carrier and a surfactant or blend of surfactants. Solid carriers suitable for this use are found in the classes of naturally occurring clays, silicates, silicas, carbonates, limes and organic materials. Typical of these are kaolin, fuller's earth, talc, diatomaceous earth, magnesium lime, dolomite, walnut shell flour, tobacco dust and sawdust. Commonly used emulsifying and wetting agents include polyoxyethylated alkylphenols, fatty alcohols, fatty acids and alkylamines, alkylarene sulfonates and dialkyl sulfosuccinates; spreading agents include such materials as glycerol mannitan laurate and a condensate of polyglycerol and oleic acid modified with phthalic anhydride; and dispersing agents include such materials as the sodium salt of the copolymer of maleic anhydride and an olefin, such as diisobutylene, sodium lignin sulfonate and sodium formaldehyde-naphthalene sulfonates.

Typical wettable powders may contain, for example, 10 to 80 percent of the herbicidal imidates, and it is usually desirable to add from 1 to 10 percent by weight of the surfactant; the remainder of the formulation being, of course, the carrier.

Dust concentrates are made by compounding the imidic acid derivatives of this invention with inert carriers normally employed for the manufacture of pesticidal dusts for agricultural use, such as talcs, finely particled clays, pyrophyllite, diatomaceous earth, magnesium carbonate, sulfur or botanical flours, such as soybean, wood, wheat, cottonseed and walnut shell. Dust concentrates containing from 20 to 80 percent of the toxicant are commonly prepared, but as used, the dusts preferably contain 1 to 20 percent of the active ingredient. Dust concentrates may be conveniently prepared by diluting a wettable powder formulation with the finely particled solid carriers customarily used in pesticidal dusts.

Granular formulations are made by incorporating the imidic acid derivatives of this invention into granular or pelletized forms of agronomically acceptable carriers, such as granular clays, vermiculite, charcoal, ground corn cobs, or bran in a range of sizes from 8 to 60 mesh (U.S. Standard Sieve Series Sizes). Such granular formulations may be made to contain the imidate in from 1 to 50 percent by weight.

One convenient method for preparing a solid formulation is to impregnate the toxicant onto the solid carrier by means of a volatile solvent, such as acetone. In this manner, adjuvants, such as fertilizers, activators, synergists, adhesives and various surfactants may also be incorporated. Furthermore, pesticides, including insecticides and fungicides, may be used in conjunction with or admixed with the herbicidal agents of this invention.

The imidic acid derivatives of this invention were evaluated in a standard herbicide screening procedure. This method involves planting seeds of representative crops and weeds in soil, allowing the seeds to germinate and when the seedlings are about 2 weeks old, applying thereto the test compound. The phytotoxic responses and state of growth of the test plants are measured about 2 weeks later. The agents are applied at desired rates in pounds per acre, usually in the range of 1 to 20 pounds, and at a standard carrier rate, if as a spray usually about 50 gallons per acre, although higher and lower carrier rates may be used. However, the major factor in determining herbicidal utility is the rate of application.

The compounds of this invention were evaluated as herbicides in a standard greenhouse procedure at 10 lbs./A. using the following monocotyledonous (M) and dicotyledonous (D) species Monocots (M)
barnyardgrass (Echinochloa crusgalli)
crabgrass (Digitaria sanguinalis)
Johnsongrass (Sorghum halepense)
Wild oats (Avena fatua)
Dicots (D)
bindweed (Convolvulus arvensis)
curly dock (Rumex crispus)
velvetleaf (Abutilon theophrasti)
wild mustard (Brassica Kaber)

The following test procedure was employed. Seeds of selected crops and weeds were planted in soil in flats. For preemergence tests, the flats were treated with the test compound immediately after the planting. For postemergence tests, the seeds were allowed to germinate, and after 2 weeks the flats were treated with the test compound. The compound to be evaluated was sprayed over the flats using a carrier volume equivalent to 50 gallons per acre. About 2 weeks after the application of the test compound, the state of growth of the plants was observed and the phytotoxic effect of the compound evaluated. Table III gives the average percent control achieved by the test compounds.

Table III

Herbicidal Data

| Example | Preemergence | % Control | Postemergence |
|---|---|---|---|
| Kerb | M | 100 | 50 |
|  | D | 95 | 78 |
| 1 | M | 100 | 60 |
|  | D | 95 | 65 |
| 2 | M | 17 | 45 |
|  | D | 60 | 40 |
| 3 | M | 77 | 20 |
|  | D | 59 | 50 |
| 4 | M | 70 | 55 |
|  | D | 55 | 45 |
| 5 | M | 55 | 7 |
|  | D | 27 | 10 |
| 6 | M | 20 | 10 |
|  | D | 30 | 42 |
| 7 | M | 10 | 67 |
|  | D | 0 | 45 |

In other tests the compounds of examples 1, 3 and 4 were evaluated in a secondary preemergence greenhouse test by surface application as described above at 4 lbs./A. and in a preplant soil-incorporation greenhouse application at 4 and/or 2 lbs./A. with a number of weed and crop species. The plant species involved included:

Plant
Monocotyledonous
A    barnyardgrass
B    crabgrass
C    downy brome         (Bromus tectorum)
D    foxtail             (Setaria faberii)
E    Johnsongrass
F    nutsedge            (Cyperus esculentus)
G    quackgrass          (Agropyron repens)
H    ryegrass            (Lolium perenne)
I    wild oats
J    yellow millet       (Setaria italica)
Dicotyledonous
K    bindweed
L    curly dock
M    lambsquarters       (Chenopodium album)
N    morningglory        (Ipomoea purpurea)
O    pigweed             (Amaranthus retroflexus)
P    velvetleaf
Q    wild carrot         (Daucus carota)
R    wild mustard
S    cocklebur           (Xanthium pensylvanicum)
T    smartweed           (Polygonum pensylvanicum)
Crops
U    alfalfa             Medicago sativa
V    beans, dwarf        (Phaseolus vulgaris)
W    corn                (Zea maize)
X    cotton              (Gossypium herbaceum)
Y    cucumber            (Cucumis sativa)
Z    peanut              (Arachis hypogaea)
AA   rice                (Oryza sativa)
AB   soybean             (Soja max)
AC   tomato              (Lycopersicum esculentum)
AD   wheat               (Triticum vulgare)

The following procedure was used in the preplant incorporation test. Seeds of selected crops and weeds were placed on the surface of soil in flats. Cheesecloth was then placed over the seeds and a ½-inch layer of soil is laid on the cheesecloth. After the test compound is sprayed over the flats in the usual manner, the soil over the cheese-cloth is mixed thoroughly, the cheesecloth removed, and the soil used to recover the planted seeds. After about two weeks, evaluations of herbicidal activity are made.

Table IV gives the results of these two types of tests.

TABLE IV

Herbicidal data on preemergence surface and preplant incorporated applications

| | Kerb | | | Ex. 1 | | | Ex. 3 | | Ex. 4 | | |
|---|---|---|---|---|---|---|---|---|---|---|---|
| | 6 | 4 | | 2 | 4 | | 2 | 4 | 2 | 4 | |
| Lbs./A | I* | S* | I | I | S | I | I | S | I | S | I |
| Plants: | | | | | | | | | | | |
| Monocots: | | | | | | | | | | | |
| A | 99 | 90 | 100 | 99 | 90 | 100 | 0 | 50 | 30 | 90 | 90 |
| B | 100 | 100 | 100 | 100 | 100 | 100 | 0 | 95 | 80 | 90 | 100 |
| C | 100 | 70 | 100 | 100 | 70 | 100 | 0 | 40 | 100 | 50 | 90 |
| D | 100 | 100 | 100 | 100 | 100 | 100 | 0 | 0 | 99 | 100 | 99 |
| E | 99 | 90 | 99 | 99 | 100 | 99 | 0 | 0 | 70 | 90 | 80 |
| F | 0 | 0 | 0 | 0 | 0 | 0 | 0 | 0 | 0 | 0 | 0 |
| G | 100 | 90 | 100 | 100 | 70 | 100 | 100 | 70 | 80 | 50 | 99 |
| H | 100 | 100 | 100 | 100 | 100 | 100 | 100 | 99 | 100 | 90 | 100 |
| I | 90 | 80 | 100 | 100 | 90 | 100 | 90 | 99 | 80 | 50 | 90 |
| J | 99 | 100 | 100 | 100 | 90 | 100 | 0 | 0 | 10 | 60 | 70 |
| Average | 89 | 82 | 90 | 90 | 81 | 90 | 29 | 45 | 65 | 67 | 82 |
| Dicots: | | | | | | | | | | | |
| K | 0 | 0 | 0 | 0 | 0 | 0 | 0 | 0 | 0 | 0 | 0 |
| L | 100 | 80 | 100 | 100 | 90 | 100 | 100 | 80 | 99 | 80 | 99 |
| M | 100 | 90 | 100 | 100 | 90 | 100 | 50 | 0 | 80 | 90 | 90 |
| N | 90 | 40 | 70 | 30 | 40 | 70 | 80 | 0 | 0 | 10 | 0 |
| O | 100 | 90 | 100 | 100 | 90 | 100 | 0 | 60 | 0 | 50 | 50 |
| P | 80 | 10 | 80 | 30 | 0 | 30 | 30 | 0 | 0 | 0 | 0 |
| Q | 0 | 0 | 0 | 0 | 0 | 0 | 0 | 0 | 0 | 0 | 0 |
| R | 50 | 0 | 80 | 0 | 0 | 0 | 0 | 0 | 0 | 0 | 0 |
| S | | | 10 | 0 | | 0 | 0 | | 0 | | 0 |
| T | 100 | | 100 | 100 | | 100 | 100 | | 100 | | 100 |
| Average | 69 | 39 | 70 | 46 | 39 | 50 | 36 | 18 | 28 | 29 | 34 |
| Crops: | | | | | | | | | | | |
| U | 20 | | 0 | 0 | | 90 | 50 | | 20 | | 0 |
| V | 0 | | 0 | 0 | | 0 | 0 | | 0 | | 0 |
| W | 50 | 20 | 80 | 80 | 0 | 80 | 0 | 0 | 0 | 0 | 80 |
| X | 50 | 0 | 50 | 50 | 0 | 50 | 0 | 0 | 0 | 0 | 0 |
| Y | 80 | | 90 | 70 | | 80 | 0 | | 0 | | 60 |
| Z | 0 | | 0 | 0 | | 0 | 0 | | 0 | | 0 |
| AA | 70 | 0 | 90 | 60 | 0 | 60 | 0 | 0 | 0 | 0 | 0 |
| AB | 20 | 10 | 60 | 0 | 0 | 0 | 0 | 40 | 0 | 0 | 0 |
| AC | 100 | 90 | 100 | 100 | 90 | 100 | 0 | 0 | 90 | 70 | 100 |
| AD | 80 | 0 | 100 | 80 | 10 | 90 | 0 | 0 | 40 | 0 | 70 |

*I=incorporated, S=surface.

We claim:
1. A compound of the formula

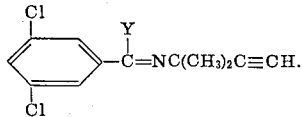

wherein Y is bromine or chlorine.

2. A compound according to claim 1 wherein Y is bromine.

3. A compound according to claim 1 wherein Y is chlorine.